(12) United States Patent
Yoon et al.

(10) Patent No.: US 10,876,907 B2
(45) Date of Patent: Dec. 29, 2020

(54) PRESSURE DETECTION SENSOR HAVING A PLURALITY OF DIELECTRIC LAYERS AND A PLURALITY OF ELECTRODE LAYERS WITH CONDUCTIVE PATHS AND WIRING PORTIONS

(71) Applicant: LG INNOTEK CO., LTD., Seoul (KR)

(72) Inventors: Hyung Yoon, Seoul (KR); Bi Yi Kim, Seoul (KR); Ji Hye Kim, Seoul (KR); Hyun Gyu Park, Seoul (KR); In Hee Cho, Seoul (KR); Man Hue Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/311,222

(22) PCT Filed: May 23, 2017

(86) PCT No.: PCT/KR2017/005329
§ 371 (c)(1),
(2) Date: Dec. 19, 2018

(87) PCT Pub. No.: WO2018/004129
PCT Pub. Date: Jan. 4, 2018

(65) Prior Publication Data
US 2019/0234814 A1    Aug. 1, 2019

(30) Foreign Application Priority Data
Jun. 29, 2016    (KR) ........................ 10-2016-0081639

(51) Int. Cl.
*G01L 1/14* (2006.01)
*H01B 1/02* (2006.01)
(Continued)

(52) U.S. Cl.
CPC ............... *G01L 1/146* (2013.01); *G01L 1/14* (2013.01); *H01B 1/02* (2013.01); *H01B 3/30* (2013.01);
(Continued)

(58) Field of Classification Search
CPC ......... G01L 1/146; G01L 1/142; G01L 1/205; G01L 1/148; H01G 5/0136; H01G 5/0138;
(Continued)

(56) References Cited

U.S. PATENT DOCUMENTS 4,836,033 A * 6/1989 Seitz .................... A61B 5/1036
361/291
5,693,886 A    12/1997 Seimiya et al.
(Continued)

FOREIGN PATENT DOCUMENTS

JP    H 0943080    2/1997
JP    2005-164448    6/2005
(Continued)

OTHER PUBLICATIONS

International Search Report (with English Translation) and Written Opinion dated Aug. 7, 2017 issued in Application No. PCT/KR2017/005329.

*Primary Examiner* — Tran M. Tran
(74) *Attorney, Agent, or Firm* — KED & Associates LLP (57) ABSTRACT

A pressure detection sensor according to one embodiment of the present invention includes a first electrode layer including a channel portion configured to output a sensing signal and a wiring portion connected to the channel portion, a first elastic dielectric layer disposed on the first electrode layer, a second electrode layer disposed on the first elastic dielectric layer at a position corresponding to the channel portion, a second elastic dielectric layer disposed on the second (Continued)

electrode layer, and a third electrode layer disposed on the second elastic dielectric layer, wherein, when a pressure is applied to the third electrode layer, capacitances of the first elastic dielectric layer and the second elastic dielectric layer are changed.

17 Claims, 8 Drawing Sheets

(51) Int. Cl.
  *H01B 3/30* (2006.01)
  *H01B 3/42* (2006.01)
  *H01G 5/011* (2006.01)
  *H01G 5/013* (2006.01)
  *H01G 5/16* (2006.01)

(52) U.S. Cl.
  CPC .............. *H01B 3/42* (2013.01); *H01G 5/011* (2013.01); *H01G 5/0136* (2013.01); *H01G 5/16* (2013.01)

(58) Field of Classification Search
  CPC ...... A61B 2562/0247; A61B 2562/046; A61B 2562/066; A61B 5/1115; B60R 21/01524; B61R 21/01532
  USPC .................................... 73/780, 767, 862.046
  See application file for complete search history.

(56) References Cited

U.S. PATENT DOCUMENTS

| | | | | |
|---|---|---|---|---|
| 6,499,359 B1* | 12/2002 | Washeleski | ............ | B60N 2/002 73/862.473 |
| 7,176,390 B2* | 2/2007 | Hansen | .................... | G01G 7/06 177/136 |
| 7,578,195 B2* | 8/2009 | DeAngelis | .............. | G01L 1/146 324/687 |
| 7,703,341 B2* | 4/2010 | Ogawa | ...................... | G01L 1/14 73/862.046 |
| 7,719,007 B2* | 5/2010 | Tompkins | ................ | G01L 1/142 257/48 |
| 7,958,789 B2* | 6/2011 | Hayakawa | ............... | G01B 7/22 73/780 |
| 8,451,011 B2* | 5/2013 | Hayakawa | ............... | G01L 1/142 324/658 |
| 8,528,411 B2* | 9/2013 | Matsumoto | ............ | C08G 18/12 73/715 |
| 8,739,623 B2* | 6/2014 | Chen | .................... | G01N 27/223 361/268 |
| 8,904,876 B2* | 12/2014 | Taylor | ........................ | G01L 1/18 361/283.4 |
| 8,950,265 B2* | 2/2015 | Dunn | ..................... | G01L 9/0072 73/714 |
| 8,997,588 B2* | 4/2015 | Taylor | ........................ | G01L 1/00 73/862.041 |
| 9,274,010 B2* | 3/2016 | Maeda | ..................... | G01L 1/146 |
| 9,494,544 B2* | 11/2016 | Hayakawa | ............... | G06F 3/044 |
| 9,528,971 B2* | 12/2016 | Teranishi | ............ | G01N 33/0047 |
| 9,542,028 B2* | 1/2017 | Filiz | .......................... | G06F 3/044 |
| 9,665,200 B2* | 5/2017 | Filiz | ........................... | G01L 1/20 |
| 9,671,297 B2* | 6/2017 | Sibbett | ..................... | B25J 19/02 |
| 9,782,955 B2* | 10/2017 | Dolezal | ..................... | B32B 7/02 |
| 9,841,850 B2* | 12/2017 | Schediwy | ............... | G06F 3/044 |
| 9,863,991 B2* | 1/2018 | Yashiro | ................... | G06F 3/044 |
| 9,904,395 B2* | 2/2018 | Ogura | ................... | G06F 3/0414 |
| 9,965,077 B2* | 5/2018 | Kim | ......................... | G06F 3/044 |
| 10,088,960 B2* | 10/2018 | Yilmaz | ................... | G01D 5/2405 |
| 10,156,487 B2* | 12/2018 | Choi | ........................... | G01L 5/00 |
| 10,156,930 B2* | 12/2018 | Kano | ....................... | G06F 3/044 |
| 10,209,805 B2* | 2/2019 | Lee | ......................... | G06F 3/0414 |
| 10,267,690 B2* | 4/2019 | Wu | ........................... | G01L 1/146 |
| 10,317,442 B2* | 6/2019 | Kawaguchi | ......... | G01R 27/2605 |
| 10,337,849 B2* | 7/2019 | Otaka | ...................... | G01D 5/2405 |
| 10,452,215 B2* | 10/2019 | Chang | ..................... | G01L 1/146 |
| 10,528,206 B1* | 1/2020 | Fujii | ................... | G06F 3/04166 |
| 2006/0162464 A1* | 7/2006 | Hayashi | ................... | A61B 5/16 73/818 |
| 2010/0308846 A1* | 12/2010 | Camus | ................... | G01L 1/142 324/679 |
| 2011/0279410 A1* | 11/2011 | Han | ........................ | G06F 3/044 345/174 |
| 2013/0300695 A1* | 11/2013 | Cho | ......................... | G06F 3/044 345/173 |
| 2016/0231098 A1* | 8/2016 | Otaka | ...................... | G06F 3/044 |
| 2016/0274724 A1* | 9/2016 | Chang | ................... | G06F 3/0416 |
| 2016/0378223 A1* | 12/2016 | Hyuga | ..................... | G06F 3/044 345/174 |
| 2018/0149685 A1* | 5/2018 | Nakashima | ........ | G01R 29/0814 |
| 2018/0224346 A1* | 8/2018 | Kawaguchi | ............... | G01L 5/00 |

FOREIGN PATENT DOCUMENTS

| | | |
|---|---|---|
| JP | 2013-096716 | 5/2013 |
| JP | 2013-205197 | 10/2013 |
| KR | 2004-0077656 | 9/2004 |

* cited by examiner

| 16pt CH | STEP | FIRST STEP (125cm, GIRL, 35kg) | | | | SECOND STEP (131cm, BOY, 45kg) | | | |
|---|---|---|---|---|---|---|---|---|---|
| | SLAB | - | 110kg/cm² 3mm | 110kg/cm² 5mm | 85kg/cm² 5mm | - | 110kg/cm² 3mm | 110kg/cm² 5mm | 85kg/cm² 5mm |
| TOTAL SUM | Raw | 71.2 | 58.5 | 50.7 | 37.3 | 98.8 | 92.0 | 80.4 | 47.5 |
| | ΔSum | | -12.7 | -20.5 | -33.9 | | -6.8 | -18.4 | -51.3 |
| | %Sum | | -18% | -29% | -48% | | -7% | -19% | -51% |
| AVERAGE | Raw | 4.5 | 3.7 | 3.2 | 2.3 | 6.2 | 5.8 | 5.0 | 3.7 |
| | ΔAverage | | -0.8 | -1.3 | -2.2 | | -0.4 | -1.2 | -2.5 |
| | %Average | | -18% | -29% | -48% | | -7% | -19% | -40% |
| MAXIMUM VALUE | Raw | 17.6 | 13.3 | 11.7 | 10.7 | 11.4 | 13 | 9.8 | 7.7 |
| | ΔMax | | -4.3 | -5.9 | -6.9 | | 1.6 | -1.6 | -3.7 |
| | %Max | | -24% | -34% | -39% | | 14% | -14% | -32% |
| MINIMUM VALUE | Raw | 1.0 | 1.0 | 1.0 | 1.0 | 3 | 2.2 | 2.2 | |
| | ΔMin | | 0 | 0 | | | -0.8 | -0.8 | |
| | %Min | | 0% | 0% | | | -27% | -27% | |

PRESSURE DETECTION SENSOR HAVING A PLURALITY OF DIELECTRIC LAYERS AND A PLURALITY OF ELECTRODE LAYERS WITH CONDUCTIVE PATHS AND WIRING PORTIONS

CROSS-REFERENCE TO RELATED PATENT APPLICATIONS

This application is a U.S. National Stage Application under 35 U.S.C. § 371 of PCT Application No. PCT/KR2017/005329, filed May 23, 2017, which claims priority to Korean Patent Application No. 10-2016-0081639, filed Jun. 29, 2016, whose entire disclosures are hereby incorporated by reference.

TECHNICAL FIELD

The present invention relates to a pressure detection sensor.

BACKGROUND ART

Recently, with development of electronic technology and information technology, the health care field has been rapidly developing. That is, a health care system capable of checking a state of a human body using bio information is required, and particularly, a technology for obtaining the bio information using a chair mainly used in a daily life is being developed. For example, a technology for installing a sensor configured to detect a pressure in the chair to detect a weight, an age group, a posture, and the like of a seated person is being developed.

A general pressure detection sensor may have a structure in which a lower electrode, an elastic dielectric layer, and an upper electrode are sequentially stacked. In such a pressure detection sensor, a thickness of the elastic dielectric layer is changed according to a change in pressure applied to the upper electrode, and a capacitance is changed according to a change in thickness of the elastic dielectric layer. In addition, a pressure applied to the upper electrode may be calculated on the basis of a change in amount of capacitance.

However, in cases in which a pressure is applied to a line of the pressure detection sensor and an electromagnetic wave is generated around the pressure detection sensor, there is a limitation in that a pressure may be detected in a region to which a pressure is not applied.

In addition, there is a problem in that a change in external environment such as shaking or electromagnetic waves acts as noise in the pressure detection sensor.

DISCLOSURE

Technical Problem

The present invention is directed to providing a pressure detection sensor configured to detect a pressure applied thereto.

Technical Solution

One aspect of the present invention provides a pressure detection sensor which includes a first electrode layer including a channel portion configured to output a sensing signal and a wiring portion connected to the channel portion, a first elastic dielectric layer disposed on the first electrode layer, a second electrode layer disposed on the first elastic dielectric layer at a position corresponding to the channel portion, a second elastic dielectric layer disposed on the second electrode layer, and a third electrode layer disposed on the second elastic dielectric layer, wherein, when a pressure is applied to the third electrode layer, capacitances of the first elastic dielectric layer and the second elastic dielectric layer are changed.

The third electrode layer may be disposed at a position corresponding to the wiring portion.

The first electrode layer, the second electrode layer, and the third electrode layer may include conductive fiber materials.

A thickness of the first elastic dielectric layer may be smaller than that of the second elastic dielectric layer.

The thickness of the first elastic dielectric layer may be in a range of 0.7 mm to 1.5 mm, and the thickness of the second elastic dielectric layer may be in a range of 3 mm to 5 mm.

The thickness of the second elastic dielectric layer may be in a range of 2.7 mm to 3.3 mm.

A density of the first elastic dielectric layer may be lower than that of the second elastic dielectric layer.

The density of the second elastic dielectric layer may be in a range of 99 kg/cm$^3$ to 121 kg/cm$^3$.

A hardness of the first elastic dielectric layer may be lower than that of the second elastic dielectric layer.

A pattern which matches the channel portion may be formed on the third electrode layer.

Another aspect of the present invention provides a pressure detection apparatus including a pressure detection sensor, a signal processor connected to the pressure detection sensor and configured to process an electric signal generated by the pressure detection sensor, and a controller connected to the signal processor and configured to generate a control signal on the basis of the signal processed by the signal processor, wherein the pressure detection sensor includes a first electrode layer including a channel portion configured to output a sensing signal and a wiring portion connected to the channel portion, a first elastic dielectric layer disposed on the first electrode layer, a second electrode layer disposed on the first elastic dielectric layer at a position corresponding to the channel portion, a second elastic dielectric layer disposed on the second electrode layer, and a third electrode layer disposed on the second elastic dielectric layer, wherein, when a pressure is applied to the third electrode layer, capacitances of the first elastic dielectric layer and the second elastic dielectric layer are changed.

Advantageous Effects

According to embodiments, a pressure detection sensor can precisely detect a pressure based on an applied weight and accurately detect a distribution of the pressure.

Particularly, the pressure detection sensor according to the embodiment may prevent noise which is caused by a pressure or prevent touch noise which is caused by an electromagnetic wave generated around the pressure detection sensor, a touch of a hand, and the like.

In addition, the pressure detection sensor according to one embodiment of the present invention can include a plurality of elastic dielectric layers and excellently transmit a pressure.

In addition, according to the present invention, since a pressure is not detected in units of specific points but is detected in units of surfaces, the pressure detection sensor which is advantageous for determining a posture can be provided.

In addition, the pressure detection sensor according to the embodiment of the present invention can be formed to have a large area and can allow a user not to feel a strange sensation. In addition, the pressure detection sensor according to the embodiment of the present invention can have a high resolution and can be simply modularized.

MODES OF THE INVENTION

As the invention allows for various changes and numerous embodiments, specific embodiments will be illustrated in the drawings and described in detail in the written description. However, this is not intended to limit the present invention to specific modes of practice, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited to these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements.

The terminology used herein is for the purpose of describing particular embodiments only and is not intended to be limiting to the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Example embodiments of the invention will be described below in more detail with reference to the accompanying drawings. Components that are the same or correspond to each other are rendered with the same reference numeral regardless of the figure number, and redundant description thereof will be omitted.

Figure 1:
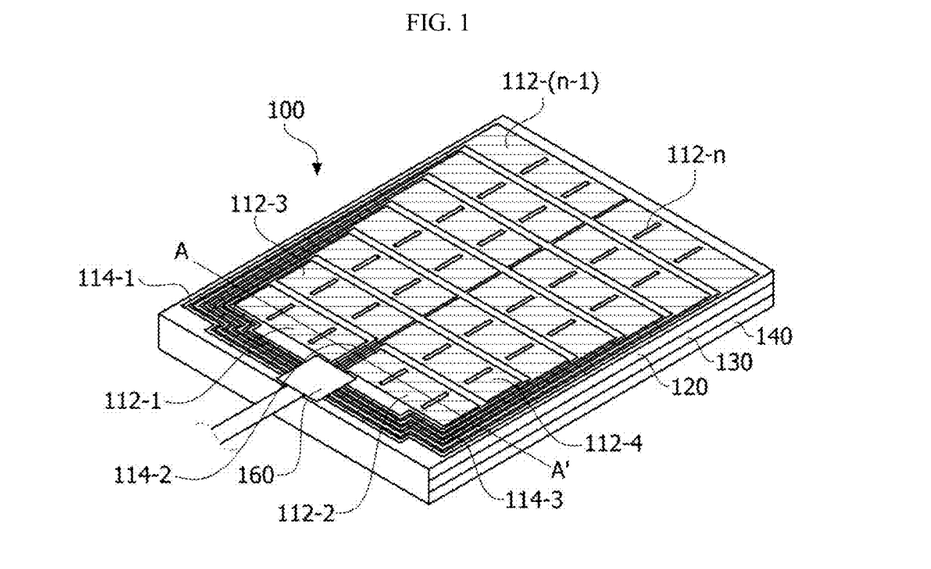
FIG. 1 is a bottom view illustrating a pressure detection sensor according to one embodiment of the present invention.
Figure 2:
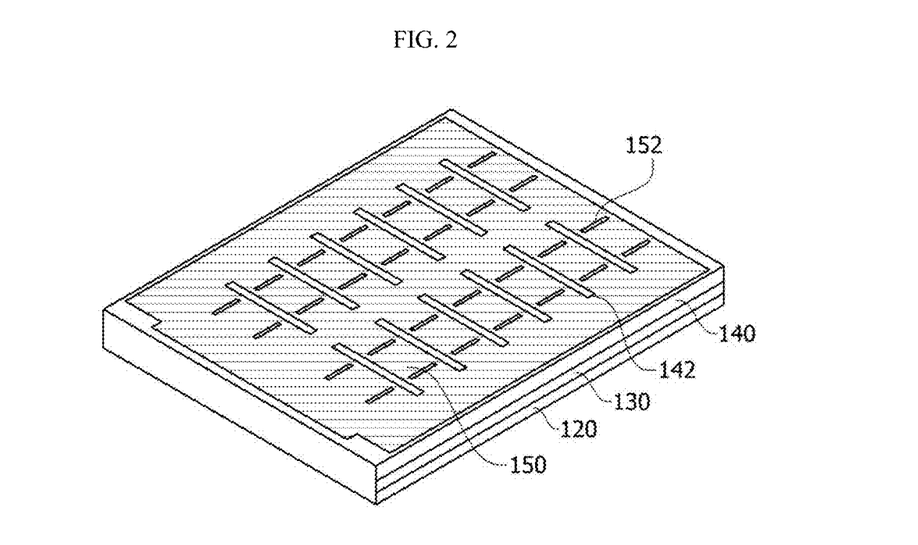
FIG. 2 is a top view illustrating the pressure detection sensor according to one embodiment of the present invention.
Figure 3:
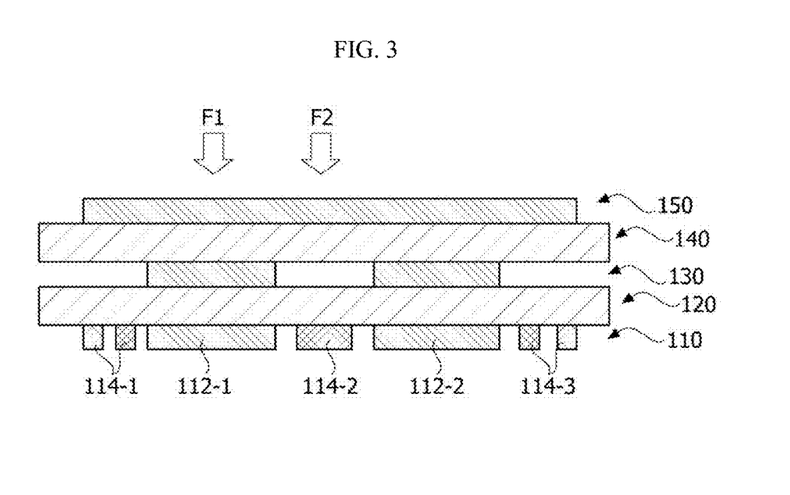
FIG. 3 is a cross-sectional view taken along line A-A' of FIG. 1.
Figure 4:
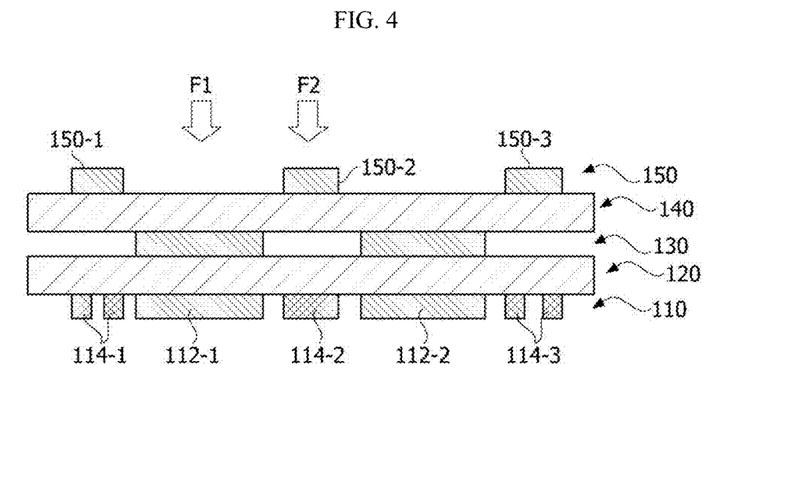
FIG. 4 is a cross-sectional view illustrating a pressure detection sensor according to another embodiment of the present invention.

FIG. 1 is a bottom view illustrating a pressure detection sensor according to one embodiment of the present invention, FIG. 2 is a top view illustrating the pressure detection sensor according to one embodiment of the present invention, FIG. 3 is a cross-sectional view taken along line A-A' of FIG. 1, and FIG. 4 is a cross-sectional view illustrating a pressure detection sensor according to another embodiment of the present invention.

Referring to FIGS. 1 to 3, a pressure detection sensor 100 includes a first electrode layer 110 having channel portions 112 and wiring portions 114, a first elastic dielectric layer 120 disposed on the first electrode layer 110, a second electrode layer 130 disposed on the first elastic dielectric layer 120 to correspond to the channel portions 112, a second elastic dielectric layer 140 disposed on the second electrode layer 130, and a third electrode layer 150 disposed on the second elastic dielectric layer 140.

The first electrode layer 110 includes the channel portions 112 and the wiring portions 114 connected to the channel portions 112. The channel portions 112 may detect a change in capacitance between the first elastic dielectric layer 120 and the second elastic dielectric layer 140 due to a pressure applied to the third electrode layer 150 through a change in voltage and an amount of charge measured between the third electrode layer 150 and the first electrode layer 110. Hereinafter, the present invention will be described under a condition in which the third electrode layer 150 is connected to the second electrode layer 130 through a through hole (not shown) formed in the second elastic dielectric layer 140 and a pressure is detected through a change of the first elastic dielectric layer 120.

In addition, the pressure applied to the third electrode layer 150 may be detected through a change in detected capacitance. Pressure detection through the change in capacitance will be described in detail below.

That is, each of the channel portions 112 outputs a sensing signal, and the output sensing signal is transmitted to the outside or to a signal transmitter 160 through the wiring portions 114 electrically connected to the channel portions 112.

As illustrated in FIGS. 1 and 3, the first electrode layer 110 may include a plurality of channel portions 112-1, 112-2, 112-3, and 112-4 and a plurality of wiring portions 114-1, 114-2, and 114-3, and the channel portions 112 may be disposed to be separated in the first electrode layer 110. Accordingly, the channel portions 112 may output a subdivided sensing signal according to a position at which a pressure is applied.

In addition, the wiring portions 114 may also be disposed at various positions according to connection with the channel portions 112.

The first electrode layer 110 may include the signal transmitter 160 which is connected to the wiring portions 114 and to which a sensing signal of each of the channel portions 112 is transmitted. The signal transmitter 160 may be a rigid printed circuit board (PCB) or a flexible PCB (FPCB).

In addition, the first electrode layer 110 may include a conductive fabric. The conductive fabric is a fabric including a conductive fiber, and the conductive fiber may be a metal wire or a general fiber of which a surface is coated with a metal film. The conductive fiber may also be a general fiber in which metal particles are dispersed. Accordingly, the pressure detection sensor 100 may have flexibility.

In the case in which the conductive fiber is the metal wire, a diameter of the metal wire may be in the range of 10 μm to 100 μm. When the diameter of the metal wire is less than 10 μm, since the strength of the metal wire is low, it may be difficult to fabricate the fabric, and when the diameter of the metal wire is greater than 100 μm, the strength of the metal wire is high, flexibility of the fabric may be reduced, and thus an apparatus may be damaged while fabricating the fabric and a user may feel a strange sensation. Here, the metal wire may be formed of Cu, Ni, or a stainless alloy. The stainless steel may be, for example, a martensitic stainless alloy, a ferritic stainless alloy, an austenitic stainless alloy, a two-phase stainless alloy, a precipitation hardening stainless alloy, or the like. When the metal wire is formed of the stainless alloy, the corrosion resistance of the pressure detection sensor may be increased.

In the case in which the conductive fiber is the general fiber of which the surface is coated with the metal film, the metal film may be formed through a method in which the surface of the general fiber is coated with metal particles through a plating or sputtering method. Here, the metal particles may be Cu, Ni, or a stainless alloy, and a thickness of the metal film may be in the range or 1 μm to 50 μm. When the thickness of the metal film is less than 1 μm, since the conductivity is low, a loss may occur when a signal is transmitted, and when the thickness of the metal film is greater than 50 μm, the metal film may be easily peeled from the surface of the fiber.

In addition, a thickness of the first electrode layer 110 may be 0.1 mm or less. However, the thickness is not limited thereto.

The wiring portions 114 may include conductive fabrics like the channel portions 112.

The first elastic dielectric layer 120 is disposed on the first electrode layer 110 and is elastically deformed when a pressure is externally applied to the first elastic dielectric layer 120. In addition, the first elastic dielectric layer 120 may be formed of a dielectric having a restoring force by which a shape thereof is restored when the applied pressure is removed.

The first elastic dielectric layer 120 may include a synthetic fiber including one selected from the group consisting of a fiber material having a random fiber arrangement, such as foamed foam, nonwoven fabric, and nano web, polyurethane, nylon, polyethylene terephthalate, and polyester, or may include natural fiber, elastomer, rubber, urethane, or the like. Here, a thickness of the first elastic dielectric layer 120 may be in the range of 0.7 mm to 1.5 mm.

When a pressure is externally applied to the first elastic dielectric layer 120, the thickness of the first elastic dielectric layer 120 decreases, and a capacitance between the first electrode layer 110 and the second electrode layer 130 decreases. Such a phenomenon may be expressed as the following equation.

$$C = \varepsilon_r \varepsilon_0 \frac{A}{d} \quad \text{Equation 1}$$

Here, C is a capacitance, A is an area in which the first electrode layer 110 overlaps the second electrode layer 130, d is a distance from the first electrode layer 110 to the second electrode layer 130, $\varepsilon_r$ is a dielectric constant of the first elastic dielectric layer 120, and $\varepsilon_0$ is an electric constant.

The pressure detection sensor 100 according to one embodiment of the present invention and a pressure detection apparatus including the same may detect a pressure applied to the pressure detection sensor 100 on the basis of an amount of change in capacitance. That is, in a case in which a voltage difference between the first electrode layer 110 and the second electrode layer 130 is constantly maintained, when a capacitance is changed, an amount of charge between the first electrode layer 110 and the second electrode layer 130 is changed.

In addition, when the amount of charge between the first electrode layer 110 and the second electrode layer 130 is changed, since an electric signal transmitted between the channel portions 112 and the wiring portions 114 is changed, the pressure detection apparatus may detect a pressure applied to the pressure detection sensor 100.

The second electrode layer 130 may be disposed on the first elastic dielectric layer 120 at a position corresponding to the channel portions 112 of the first electrode layer 110 and may include a conductive fabric like the first electrode layer 110.

In addition, a thickness of the second electrode layer 130 may be 0.1 mm or less like the first electrode layer 110. However, the thickness is not limited thereto. In addition, in a case in which the channel portions 112 are sequentially disposed, the second electrode layer 130 may be disposed over an entire area of the channel portions. In addition, the second electrode layer 130 may be disposed to correspond to each of the sequential channel portions 112.

The second elastic dielectric layer 140 may be disposed on the second electrode layer 130 and may include a material which is the same as that of the first elastic dielectric layer 120. Unlike the first elastic dielectric layer 120, a thickness of the second elastic dielectric layer 140 may be in the range of 3 mm to 5 mm. As one embodiment, the thickness of the first elastic dielectric layer 120 may be 1.5 mm. In addition, the thickness of the second elastic dielectric layer 140 may be in the range of 2.7 mm to 3.3 mm. However, the thickness is not limited thereto. The thickness of the second elastic dielectric layer 140 will be described with reference to FIGS. 8 and 9.

The second elastic dielectric layer 140 absorbs an impact transmitted to the pressure detection sensor 100 due to an external pressure or compression to improve durability. In addition, disconnection between the channel portions 112 and the wiring portions 114 of the first electrode layer 110 may be prevented and contact failures between the wiring portions 114 and the signal transmitter 160 may be prevented by absorbing the impact.

Figure 5:
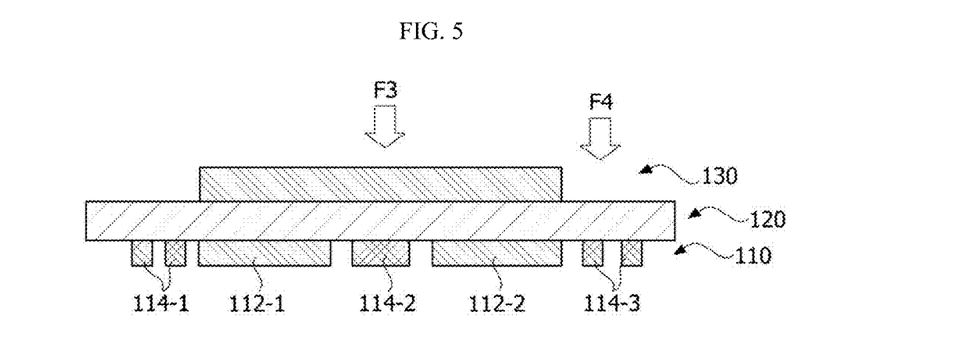
FIGS. 5 to 7 are cross-sectional, top, and bottom views illustrating a pressure detection sensor in which a second elastic dielectric layer and a third electrode layer are not present.
Figure 6:
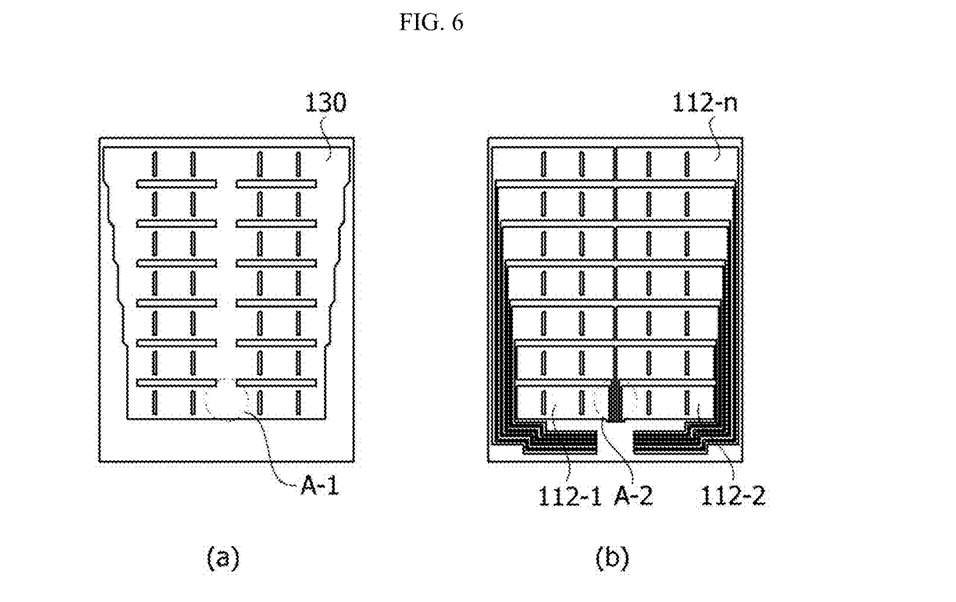
Figure 7:
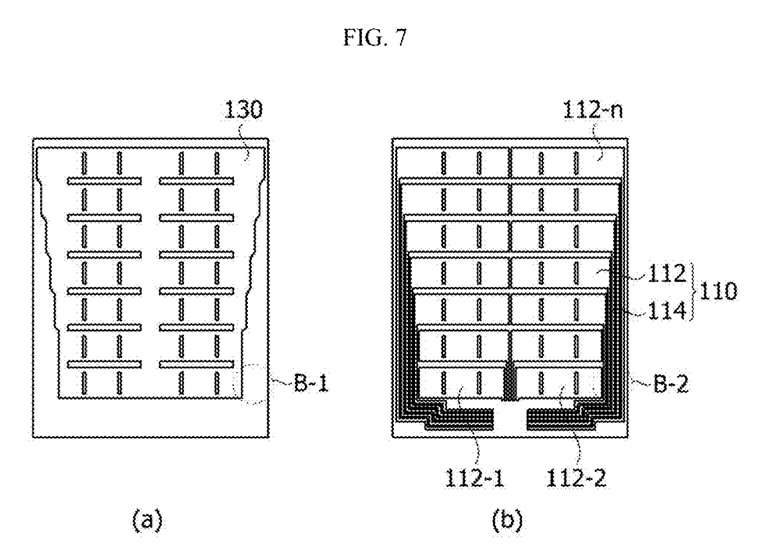

In addition, referring to FIGS. 5 to 7 which are a cross-sectional view, a bottom view, and a top view of a pressure detection sensor in which a second elastic dielectric layer and a third electrode layer are not present unlike the present invention, the pressure detection sensor detects a pressure applied to a second electrode layer 130 as described above.

As an example, in a case in which a pressure F3 is applied to the second electrode layer 130, a region to which the pressure F3 is applied is a first region A-1 in the second electrode layer 130 of FIG. 6A and a second region A-2 in the first electrode layer 110 of FIG. 6B. Here, the channel portions 112-1 and 112-2 detect the applied pressure F3. However, since the wiring portion 114-2 includes a conductive fabric which is the same as those of the channel portions 112-1 and the 112-2, as an example, pressure noise is generated in which a pressure is detected at the channel portion 112-$n$ to which a pressure is not applied.

As another example, in a case in which a pressure F4 is applied to the second electrode layer 130, a region to which the pressure F4 is applied is a third region B-1 in the second electrode layer 130 of FIG. 7A and a fourth region B-2 of a first electrode layer 110 of FIG. 7B. Here, the third region B-1 to which the pressure F4 is applied is a first elastic dielectric layer 120 in which the second electrode layer 130 is not present, and the fourth region B-2 is a wiring portion 114-3. However, a touch of a hand or the like of a human body is required in order to apply a pressure, and then touch noise is generated that a sensing signal value is rapidly changed at channel portions 112-1 and 112-2. Accordingly, it is difficult to accurately detect a pressure.

Therefore, in the pressure detection sensor 100 according to one embodiment of the present invention, the second electrode layer 130 may be disposed at a position corresponding to the channel portions 112, and the second elastic dielectric layer 140 having high density and high hardness is disposed on the second electrode layer 130, a pressure F1 applied to the third electrode layer 150 may be mostly transmitted to the first elastic dielectric layer 120. In addition, the pressure detection sensor 100 according to one embodiment may transmit a sensing signal in which pressure noise generated due to the pressure F2 is removed to the channel portions 112.

Specifically, referring to FIGS. 3 and 4, a thickness, a density, and a hardness of the second elastic dielectric layer 140 may be determined such that the second elastic dielectric layer 140 excellently transmits a pressure when the pressure F1 is applied to upper surfaces of the third electrode layer 150 and the second elastic dielectric layer 140 and the applied pressure F1 is transmitted to the first elastic dielectric layer 120. For example, when a high density/high hardness material is used, since the applied pressure F1 is mostly transmitted to the first elastic dielectric layer 120, a phenomenon in which an amplitude of a sensing signal is decreased due to the second elastic dielectric layer 140 disposed for removing pressure noise may be prevented.

As an example, the density of the second elastic dielectric layer 140 may be greater than that of the first elastic dielectric layer 120. For example, the density of the first elastic dielectric layer 120 may be 30 kg/cm$^3$, the density of the second elastic dielectric layer 140 may be 110 kg/cm$^3$. Here, the density of the second elastic dielectric layer 140 may be in the range of 99 kg/cm$^3$ to 121 kg/cm$^3$. However, the densities are not limited thereto.

In addition, a hardness of the second elastic dielectric layer 140 may be greater than that of the first elastic dielectric layer 120. For example, the hardness of the first elastic dielectric layer 120 may be 0.05 kgf/cm$^3$, and the hardness of the second elastic dielectric layer 140 may be 0.5 kgf/cm$^3$. Accordingly, as described above, an externally applied pressure is mostly transmitted to the first elastic dielectric layer 120, and the externally applied pressure may be more accurately detected due to a change in capacitance of the first elastic dielectric layer 120.

In addition, when the pressure F2 is applied to the upper surface of the third electrode layer 150 corresponding to the wiring portion 114-2 of the first electrode layer 110, the second electrode layer 130 may be disposed at a position which only corresponds to the channel portions 112 but does not correspond to the wiring portion. Accordingly, a path, through which changes in capacitance of the first elastic dielectric layer 120 and the second elastic dielectric layer 140 on the wiring portion 114-2 are detected, is blocked. Accordingly, generation of pressure noise due to the applied pressure F2 may be prevented.

Accordingly, the pressure detection sensor 100 that removes pressure noise and excellently transmits a signal of a pressure can be provided.

Third electrode layers 150 may be disposed on a second elastic dielectric layer 140. Referring to FIG. 4, third electrode layers 150-1, 150-2, and 150-3 may be disposed on the second elastic dielectric layer 140 at positions corresponding to wiring portions 114-1, 114-2, and 114-3 of a first electrode layer 110. Accordingly, touch noise generated by the second elastic dielectric layer 140 due to a touch of a figure or the like of a human body can be blocked.

Accordingly, both of the pressure noise and touch noise may be removed in the pressure detection sensor 100 according to one embodiment of the present invention.

In addition, the third electrode layers 150 may be disposed on an entirety of the second elastic dielectric layer 140 or at positions corresponding to wiring portions 114 of the first electrode layer 110. Since the third electrode layers 150 are disposed at the positions corresponding to the wiring portions 114 of the first electrode layer 110, a manufacturing cost of the pressure detection sensor 100 according to one embodiment of the present invention can be reduced.

In addition, in the third electrode layers 150, patterns 152 which match an arrangement of a plurality of channel portions 112 of the first electrode layer 110 may be formed. Here, the third electrode layers 150 are not divided into a plurality of layers by the patterns 152. Empty spaces may be formed at some portions of the third electrode layers 150 due to the patterns 152 formed on the third electrode layer 150, or the empty spaces may be filled with insulating materials. As described above, in a case in which the patterns 152 of the third electrode layers 150 match the arrangement of the plurality of channel portions 112 of the first electrode layer 110, the sensitivity of pressure detection may be improved for each of the channel portions 112.

Figure 8:
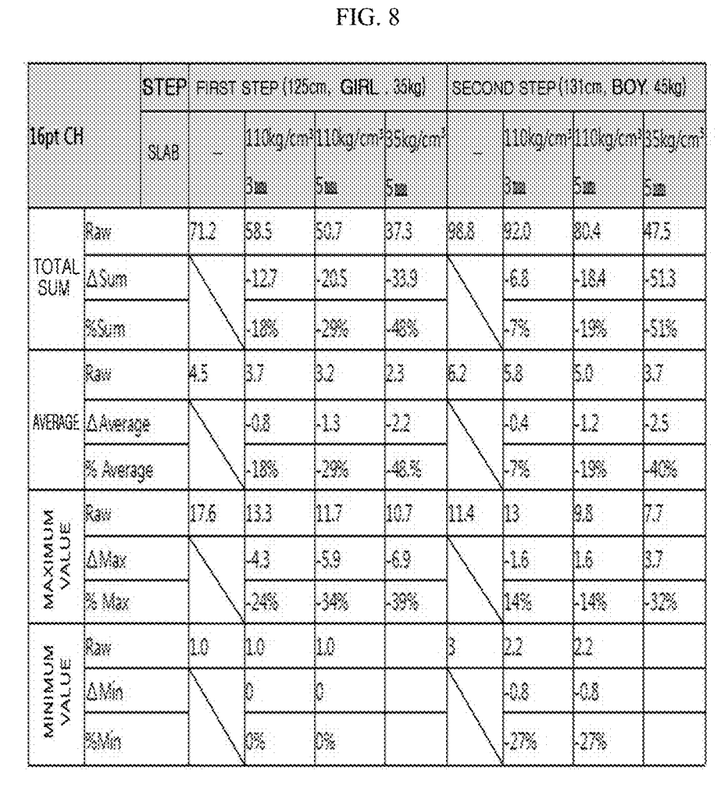
FIG. 8 is a table showing a signal reduction extent according to a thickness and a density of a second elastic dielectric layer of the pressure detection sensor on the basis of a step according to one embodiment of the present invention.
Figure 9A:
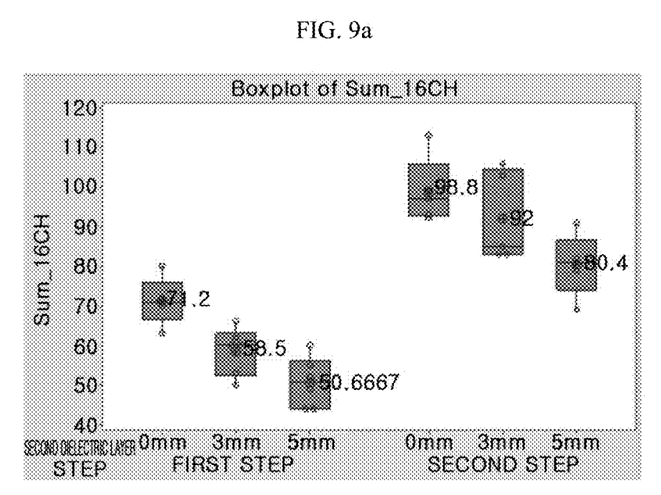
FIG. 9a to FIG. 9d is a graph showing an amplitude of a sensing signal according to a total sum (Sum), an average (Average), a maximum value (Max), and a minimum value (Min) which are results of FIG. 8.
Figure 9B:
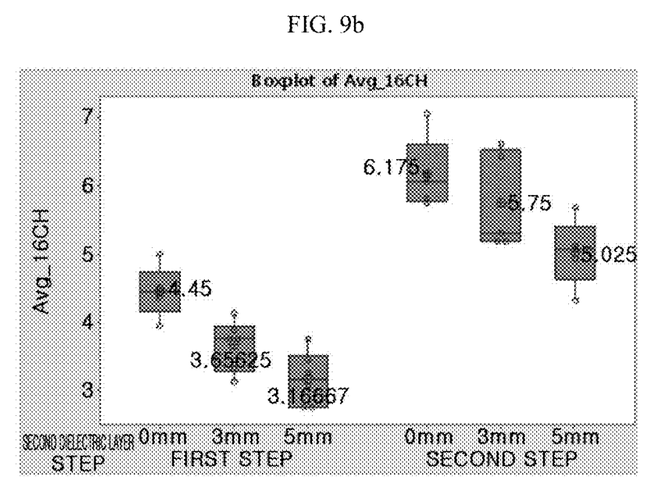
Figure 9C:
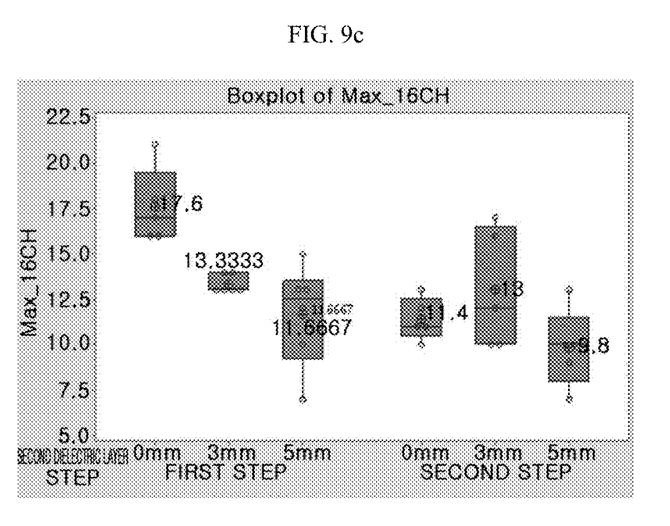
Figure 9D:
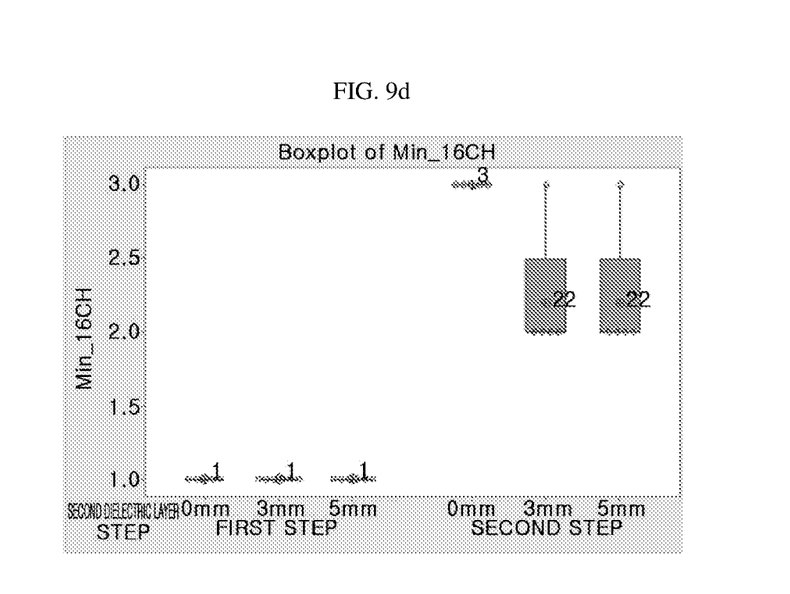

FIG. 8 is a table showing a signal reduction extent according to the thickness and the density of the second elastic dielectric layer of the pressure detection sensor on the basis of a step according to one embodiment of the present invention, and FIG. 9a to FIG. 9d is a graph showing an amplitude of a sensing signal according to a total sum (Sum), an average (Average), a maximum value (Max), and a minimum value (Min), which are results of FIG. 8.

FIGS. 8 and 9 show output values of sensing signals detected by sixteen channel portions on the basis of two steps according to cases in which the second elastic dielectric layer is not present, the thickness of the second elastic dielectric layer is different (3 mm or 5 mm), and the density of the second elastic dielectric layer is different (110 kg/cm$^3$ or 35 kg/cm$^3$).

Here, a first step is a case in which a girl who is 35 kg at 125 cm sits on the pressure detection sensor according to one embodiment of the present invention to press the pressure detection sensor, and a second step is a case in which a boy who is 45 kg at 135 cm sits on the pressure detection sensor according to one embodiment of the present invention to press the pressure detection sensor.

In addition, the Sum, the Average, the Max, and the Min are shown as the output values of each of the detected sensing signals.

Referring to FIG. 8, in the first step, in the case in which the second elastic dielectric layer has a density of 110 kg/cm$^3$ and a thickness of 3 mm, each of the Sum and the Average thereof is decreased from that of the case in which the second elastic dielectric layer is not present by 18%, in the case in which the second elastic dielectric layer has a density of 110 kg/cm$^3$ and a thickness of 5 mm, each of the Sum and the Average thereof is decreased from that of the case in which the second elastic dielectric layer is not present by 29%, and in the case in which the second elastic dielectric layer has a density of 35 kg/cm$^3$ and a thickness of 5 mm, each of the Sum and the Average thereof is decreased from that of the case in which the second elastic dielectric layer is not present by 48%.

In addition, in the second step, in the case in which the second elastic dielectric layer has a density of 110 kg/cm$^3$ and a thickness of 3 mm, each of the Sum and the Average thereof is decreased from that of the case in which the second elastic dielectric layer is not present by 7%, in the case in which the second elastic dielectric layer has a density of 110 kg/cm$^3$ and a thickness of 5 mm, each of the Sum and the Average thereof is decreased from that of the case in which the second elastic dielectric layer is not present by 19%, and in the case in which the second elastic dielectric layer has a density of 35 kg/cm$^3$ and a thickness of 5 mm, the Sum and the Average thereof are decreased from those of the case in which the second elastic dielectric layer is not present by 51% and 40%, respectively.

In addition, the Max and the Min of the output signal are the highest in the case in which the second elastic dielectric layer has the density of 110 kg/cm$^3$ and the thickness of 3 mm (except the Min in the first step).

That is, it can be seen that in the case in which the second elastic dielectric layer has the density of 110 kg/cm$^3$ and the thickness of 3 mm, a sensing signal according to an applied pressure applied to the pressure detection sensor is most sensitive.

Accordingly, the second elastic dielectric layer may be set such that the density thereof is 110 kg/cm$^3$ and the thickness thereof is 3 mm to improve the sensitivity of the pressure detection sensor.

Figure 10:
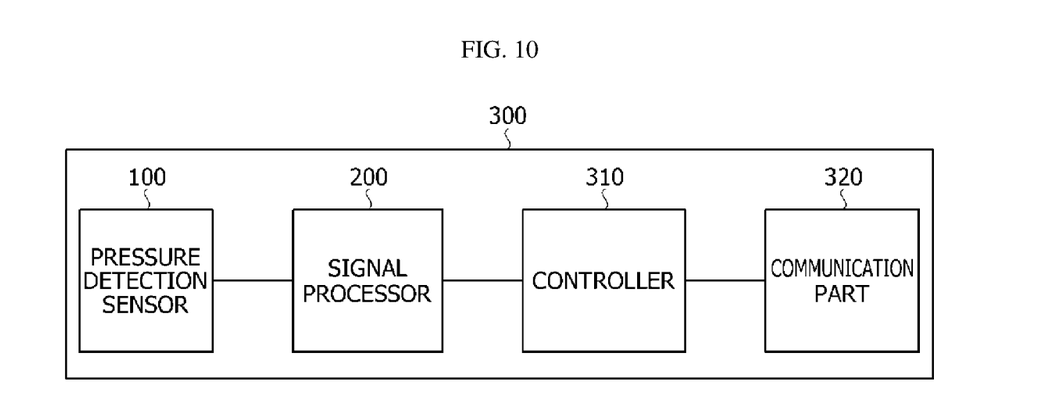
FIG. 10 is a block diagram illustrating a pressure detection apparatus embedded in a pressure detection chair according to one embodiment of the present invention
Figure 11:
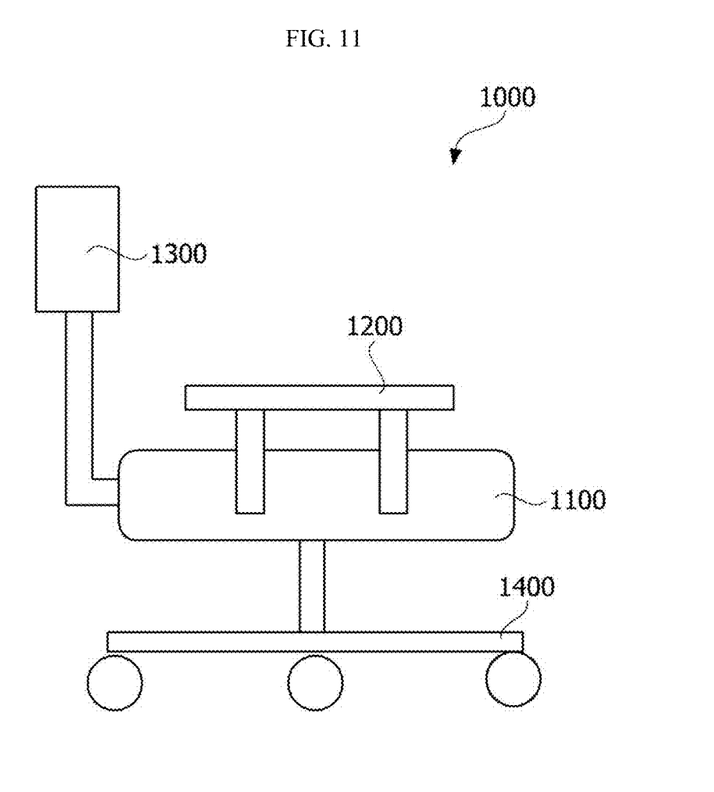
FIG. 11 is a side view illustrating the pressure detection chair according to one embodiment of the present invention.

FIG. 10 is a block diagram illustrating a pressure detection apparatus embedded in a pressure detection chair according to one embodiment of the present invention, and FIG. 11 is a side view illustrating the pressure detection chair according to one embodiment of the present invention.

Referring to FIGS. 10 and 11, a pressure detection apparatus 300 may include a pressure detection sensor 100, a signal processor 200, a controller 310, and a communication part 320. The pressure detection sensor 100 may detect whether a person sits on the seat 1100, a relative distribution of a pressure, and the like when the person sits on the seat 1100.

According to the embodiment of the present invention, the pressure detection sensor 100 may be disposed in the seat 1100. In addition, the signal processor 200 may be connected to the pressure detection sensor 100 to process an electric signal generated by the pressure detection sensor 100. In addition, the controller 310 may be connected to the signal processor 200 to generate a control signal on the basis of the signal processed by the signal processor 200. As an example, the controller 310 may control "on" and "off" states of the pressure detection apparatus 300 using a processing result of the signal detected by the pressure detection sensor 100. As another example, the controller 310 may generate diagnostic information about a posture of a seated person using a processing result of a signal detected by the pressure detection sensor 100. As still another example, the controller 310 may also generate an alarm signal and the like for correcting a posture of a seated person using a processing result of a signal detected by the pressure detection sensor 100.

In addition, the communication part 320 transmits a control signal generated by the controller 310 to an external apparatus.

A pressure detection chair 1000 includes a seat 1100, an armrest 1200, a chair back 1300, a leg 1400, and the like. When a person sits on the seat 1100, the pressure detection apparatus 300 embedded in the pressure detection chair 1000 may detect whether the person sits thereon and measure a relative distribution of a pressure due to the seated person. The pressure detection apparatus 300 may detect a weight, an age group, and a sitting posture of the person on the basis of the measured pressure distribution.

The above-described present invention is not limited to the above-described embodiments and the accompanying drawings, and it will be clear to those skilled in the art that various substitutions, modifications, and changes may be made without departing from the technical spirit of the embodiment.

The invention claimed is:
1. A pressure detection sensor comprising:
a first electrode layer including a plurality of conductive paths configured to separately output a sensing signal and a plurality of wiring portions, each of the wiring portions is separately connected to a different one of the conductive paths;
a first elastic dielectric layer disposed on the first electrode layer in a first direction;
a second electrode layer disposed on the first elastic dielectric layer at a position corresponding to all the conductive paths of the first electrode layer such that the second electrode layer substantially overlays all the conductive paths in the first direction, wherein the second electrode layer is not disposed at a position corresponding to the plurality of wiring portions of the first electrode layer;
a second elastic dielectric layer disposed on the second electrode layer in the first direction; and
a third electrode layer disposed on the second elastic dielectric layer in the first direction, wherein the third electrode layer is disposed at at least one position corresponding to the plurality of wiring portions such that the third electrode layer covers part of the wiring portions of the first electrode layer in the first direction,
wherein, when a pressure is applied to the third electrode layer, capacitances of the first elastic dielectric layer and the second elastic dielectric layer are changed.

2. The pressure detection sensor of claim 1, wherein the first electrode layer, the second electrode layer, and the third electrode layer include conductive fiber materials.

3. The pressure detection sensor of claim 1, wherein a thickness of the first elastic dielectric layer is smaller than a thickness of the second elastic dielectric layer.

4. The pressure detection sensor of claim 3, wherein:
the thickness of the first elastic dielectric layer is in a range of 0.7 mm to 1.5 mm; and
the thickness of the second elastic dielectric layer is in a range of 3 mm to 5 mm.

5. The pressure detection sensor of claim 4, wherein the thickness of the second elastic dielectric layer is in a range of 2.7 mm to 3.3 mm.

6. The pressure detection sensor of claim 1, wherein a density of the first elastic dielectric layer is lower than a density of the second elastic dielectric layer.

7. The pressure detection sensor of claim 6, wherein the density of the second elastic dielectric layer is in a range of 99 $kg/cm^3$ to 121 $kg/cm^3$.

8. The pressure detection sensor of claim 1, wherein a hardness of the first elastic dielectric layer is lower than a hardness of the second elastic dielectric layer.

9. The pressure detection sensor of claim 1, wherein a pattern which matches the plurality of conductive paths is formed on the third electrode layer.

10. The pressure detection sensor of claim 1, wherein the third electrode layer includes an empty space disposed in some positions of the third electrode layer.

11. The pressure detection sensor of claim 10, wherein the empty spaces include insulating material.

12. The pressure detection sensor of claim 1, wherein the second elastic dielectric layer comprises a through hole.

13. The pressure detection sensor of claim 12, wherein the third electrode layer is connected to the second electrode layer through the through hole.

14. The pressure detection sensor of claim 1, further comprising:
a signal transmitter connected to the plurality of wiring portions and receiving the sensing signals of the plurality of conductive paths.

15. The pressure detection sensor of claim 1, wherein the second elastic dielectric layer is made of the same material as that of the first elastic dielectric layer.

16. The pressure detection sensor of claim 1, wherein the third electrode layer is disposed over the second elastic dielectric layer.

17. A pressure detection apparatus comprising:
a pressure detection sensor;
a signal processor connected to the pressure detection sensor and configured to process an electric signal generated by the pressure detection sensor; and
a controller connected to the signal processor and configured to generate a control signal on the basis of the signal processed by the signal processor,
wherein the pressure detection sensor includes:
a first electrode layer including a plurality of conductive paths configured to output at least one sensing signal and a plurality of wiring portions, each of the wiring portions is connected to a different one of the conductive paths;
a first elastic dielectric layer disposed on the first electrode layer in a first direction;
a second electrode layer disposed on the first elastic dielectric layer in the first direction at a position corresponding to all the conductive paths of the first electrode layer such that the second electrode layer covers all the conductive paths wherein the second electrode layer is not disposed at a position corresponding to the plurality of wiring portions of the first electrode layer;
a second elastic dielectric layer disposed on the second electrode layer in the first direction; and
a third electrode layer disposed on the second elastic dielectric layer in the first direction, wherein the third electrode layer is disposed at at least one position corresponding to the plurality of wiring portions such that the third electrode layer covers part of the wiring portions of the first electrode layer in the first direction,
wherein, when a pressure is applied to the third electrode layer, capacitances of the first elastic dielectric layer and the second elastic dielectric layer are changed.

* * * * *